US009600814B2

(12) United States Patent
Tatara

(10) Patent No.: US 9,600,814 B2
(45) Date of Patent: Mar. 21, 2017

(54) TRANSACTION PROCESSING APPARATUS, TRANSACTION PROCESSING METHOD, PROGRAM AND TRANSACTION PROCESSING SYSTEM

(71) Applicant: Panasonic Intellectual Property Management Co., Ltd., Osaka (JP)

(72) Inventor: Hiromasa Tatara, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/705,721

(22) Filed: May 6, 2015

(65) Prior Publication Data
US 2016/0110968 A1    Apr. 21, 2016

(30) Foreign Application Priority Data
Oct. 20, 2014    (JP) .................. 2014-213702

(51) Int. Cl.
  *G06K 5/00*    (2006.01)
  *G06Q 20/20*    (2012.01)
  *G07G 1/00*    (2006.01)
(52) U.S. Cl.
  CPC ......... *G06Q 20/209* (2013.01); *G06Q 20/204* (2013.01); *G07G 1/0036* (2013.01)
(58) Field of Classification Search
  CPC .......... G07G 5/00; G07G 1/0036; G07G 1/14; G06Q 20/204; G06Q 20/209
(Continued)

(56) References Cited

U.S. PATENT DOCUMENTS 6,328,210 B1 * 12/2001 Kim ..................... G06Q 20/341
                                            235/380
2006/0277111 A1 * 12/2006 Bevis ..................... G06Q 20/04
                                            705/26.1
(Continued)

FOREIGN PATENT DOCUMENTS

JP    02-075097 A    3/1990
JP    02-555163 B2    11/1996
(Continued)

*Primary Examiner* — Paultep Savusdiphol
(74) *Attorney, Agent, or Firm* — Seed IP Law Group LLP

(57) ABSTRACT

A transaction processing apparatus includes: a communication unit which performs communication relating to a settlement process of transaction content using a card, with a predetermined settlement destination apparatus; a magnetic card reader unit which reads card information, which is used in the settlement of the transaction using the card, from the card; an input unit to which information regarding various matters relating to the settlement process of the transaction content using the card is input; and a printing unit which prints the card information and various matters of the transaction content as an offline settlement slip, according to the settlement process of the transaction content using the card, when the communication relating to the settlement process in the communication unit is not available. The risk of the transaction information regarding a settlement process performed in an offline state being taken is reduced. The possibility of losing the transaction information tanked in a broken transaction processing apparatus is reduced, while also reducing the complicatedness of a settlement procedure.

20 Claims, 9 Drawing Sheets

(58) Field of Classification Search
USPC .................................. 235/375, 380, 487, 494
See application file for complete search history.

(56) References Cited

U.S. PATENT DOCUMENTS

| | | | |
|---|---|---|---|
| 2011/0307318 A1* | 12/2011 | LaPorte | G06Q 20/209 705/14.33 |
| 2012/0318862 A1* | 12/2012 | Redmann | G06Q 20/24 235/379 |
| 2013/0179352 A1 | 7/2013 | Dwyre et al. | |
| 2015/0278795 A1* | 10/2015 | Jiang | G06Q 20/32 705/44 |
| 2015/0371228 A1* | 12/2015 | Kershaw | G06Q 20/28 705/77 |
| 2016/0071080 A1* | 3/2016 | Sugiyama | G07G 5/00 705/21 |

FOREIGN PATENT DOCUMENTS

| | | |
|---|---|---|
| JP | 08-329344 A | 12/1996 |
| JP | 2014-006637 A | 1/2014 |
| JP | 2014-116018 A | 6/2014 |

\* cited by examiner

BDR

TRANSACTION PROCESSING APPARATUS, TRANSACTION PROCESSING METHOD, PROGRAM AND TRANSACTION PROCESSING SYSTEM

BACKGROUND OF THE INVENTION

Field of the Invention

The present invention relates to a transaction processing apparatus, a transaction processing method, a program and a transaction processing system which are used for carrying out procedures of a settlement process in a transaction.

Description of the Related Art

For example, when a settlement process using a card (for example, a credit card) is performed in a sale of a product, a transaction processing apparatus of the related art transmits sales information to a predetermined settlement destination apparatus relating to the settlement (for example, a settlement server apparatus operated in a settlement center), in a case where credit for a card holder is inquired about and a response indicating no problems in the credit is received. In a case where a line between the transaction processing apparatus and the settlement destination apparatus for the settlement is disconnected and a one-time sales amount is less than a predetermined amount, customer information and sales information are stored and accumulated in a random access memory (RAM) in the transaction processing apparatus as transaction information. Such accumulation of the transaction information is referred to as "tanking". After the number of the tanked transaction information items for each number of sales reaches a certain value, the transaction processing apparatus collectively transmits the tanked transaction information items to the settlement destination apparatus. A transaction processing apparatus disclosed in Japanese Patent Unexamined Publication No. H2-75097 has been proposed as the related art regarding such tanking.

However, when a line between the transaction processing apparatus and the settlement destination apparatus for the settlement is disconnected, it is difficult to perform settlement service online (hereinafter, referred to as "online settlement"). This does not only apply to the disconnection of the line. In a case where a line of a store including the transaction processing apparatus installed therein has a problem due to disconnection or short circuit, or a case where a network of the line is down, or also in a case where a settlement center apparatus itself which is a settlement destination apparatus for the settlement is down (that is, in a case where the use of the settlement center apparatus is stopped), it is difficult to perform the online settlement, in the same manner as described above.

Even in a case where it is difficult to perform the online settlement, the transaction processing apparatus can perform the settlement service offline (hereinafter, referred to as "offline settlement"). That is, when the sales amount is in a range not exceeding transaction amount conditions predetermined based on a member store contract between a store and an acquirer (or a settlement processor or issuer), the transaction processing apparatus can perform the offline settlement without performing communication with the settlement destination apparatus. As a result of the offline payment, the transaction processing apparatus can perform the tanking of the transaction information.

However, in order to perform a card transaction in the settlement using an IC credit card, the transaction processing apparatus collates a personal identification number (PIN) to be input using a PIN PAD included in the transaction processing apparatus or an attachment thereof, with card information to be read by a reading apparatus included in the transaction processing apparatus or an attachment thereof. When the collation of the PIN is performed in the transaction processing apparatus and the collation matches (is authenticated), the settlement can be performed with the IC credit card.

With respect to this, in a new settlement system in which information necessary for authentication of a card to be used in a settlement process is received and transmitted between a transaction terminal apparatus and a settlement destination apparatus, the authentication of an IC credit card is not performed by the transaction terminal apparatus of the related art, but by the settlement destination apparatus. For example, transaction processing apparatus in this system transmits card information to be read by a reading apparatus included in the transaction processing apparatus or an attachment thereof to the settlement destination apparatus, and transmits the PIN to be input using a PIN PAD included in the transaction processing apparatus or an attachment thereof to the settlement destination apparatus. The collation of the PIN of the IC credit card is not performed by the transaction terminal apparatus, but by the settlement destination apparatus. Accordingly, since it is difficult to perform offline settlement using the IC credit card, it is necessary for an operator to perform offline settlement by a magnetic credit card function using information recorded in a magnet stripe provided along with the IC credit card, in order to perform the card settlement in a state other than the online state.

Since the IC credit card includes the magnetic stripe, it is possible to perform the settlement by the magnetic credit card function. In this case, an operator may inquire about credit with an acquirer or a settlement processor (or an issuer) through a phone call, and when the credit is acquired, an operator may input an approval number acquired from the acquirer (or the issuer) into the transaction terminal apparatus and perform the offline settlement. Alternatively, an operator may perform the offline settlement, without acquiring such authentication information. In both cases, the transaction terminal apparatus performs tanking of transaction information regarding the offline settlement which is performed using the magnetic credit card function. When an operator inputs the approval number into the transaction terminal apparatus, the transaction terminal apparatus may perform the tanking of the approval number with the corresponding transaction information. For reference, the credit card settlement can be performed by filling or copying the approval number and the card number in a paper credit slip, without using the transaction terminal apparatus.

However, in the settlement performed using the magnetic credit card function, the offline settlement with the acquisition of the approval number through a phone call takes a long time and the procedure thereof is complicated. Accordingly, a customer's waiting time for the settlement also becomes longer. In order to avoid such a complicated procedure and a long waiting time, an operator can perform the offline settlement by the magnetic credit card function, without acquiring the approval number. However, since the authentication of the card is not acquired as the IC card, it is difficult to prevent an unauthorized card settlement transaction in advance. Thus, at least one of the acquirer and the store (acquirer, in many cases) suffers a loss based on the member store contract described above.

When the transaction processing apparatus used for the offline settlement is broken after the sales by the offline settlement, it is difficult for an operator who performs exchange of the transaction terminal apparatus to extract transaction information from the broken transaction processing apparatus, or an operator may forget to extract the transaction information. As a result, the transaction information tanked in the broken transaction processing apparatus may not be used, and a mismatch with the transaction information held by the settlement destination may occur. Thus, it is difficult to collect accounts receivable in the offline settlement, and therefore, the store may suffer a loss.

In the configuration of the transaction terminal apparatus described above, it is difficult to adequately ensure information security of various information items (that is to say, transaction information items regarding a settlement process offline) tanked in the apparatus.

Since the transaction information tanked in the transaction terminal apparatus is held in a second card storage medium, in a case where the transaction terminal apparatus is connected to an apparatus other than the transaction processing apparatus or if the second card storage medium is taken by a malicious third party, there is a risk that the transaction information itself is easily taken.

SUMMARY OF THE INVENTION

A transaction terminal apparatus, a transaction processing method, a program, and a transaction processing system of the present disclosure, are provided to adequately ensure information security of transaction information regarding a settlement process performed in an offline state and to reduce risk of the transaction information being taken in an offline state.

The transaction terminal apparatus, the transaction processing method, the program, and the transaction processing system of the present disclosure, reduce a possibility of losing the transaction information tanked in a broken transaction processing apparatus, while also reducing the complicatedness of a settlement procedure and a loss due to an unauthorized card settlement transaction.

The transaction terminal apparatus, the transaction processing method, the program, and the transaction processing system of the present disclosure, effectively perform the offline settlement using a magnetic credit function attached to a card, even with a card (IC credit card) having a settlement system in which information necessary for authentication of a card to be used in a settlement process is transmitted and received between a transaction terminal apparatus and a settlement destination apparatus.

According to an embodiment of the present disclosure, there is provided a transaction terminal apparatus including: a communication unit which performs communication relating to a settlement process of transaction content using a card with a predetermined settlement destination apparatus; a magnetic card reader unit which reads card information, which is used in the settlement of the transaction using the card, from the card; an input unit to which information regarding various matters relating to the settlement process using the card is input; and a printing unit which prints the card information and the information regarding various matters input to the input unit as an offline settlement slip, according to the settlement process using the card, when the communication relating to the settlement process in the communication unit is not available.

In this case, when the communication relating to the settlement process of the transaction content using a card is not available between the transaction processing apparatus and the predetermined settlement destination apparatus, the transaction processing apparatus prints the information regarding various matters relating to the settlement process input to the input unit and the card information read by the magnetic card reader unit as the offline settlement slip, for each time of the settlement process of the transaction content using a card.

Accordingly, when the communication between the transaction processing apparatus and the predetermined settlement destination apparatus (for example, a settlement center apparatus) relating to the settlement process of the transaction content using a card is not available (that is, offline state), the transaction processing apparatus prints information (transaction information) regarding various matters (for example, the card brand, the settlement amount, the payment method, or the number of times of the payment) relating to the settlement process performed in the offline state and the card information regarding the card used in the settlement process as the offline settlement slip and then removes the information regarding various matters. Accordingly, even when the transaction processing apparatus is taken or is broken, it is possible to prevent degradation of information security of the transaction information by property managing the paper printout of the offline settlement slip, to adequately ensure the information security of the transaction information, and to reduce a risk of the transaction information being taken by a third party even in the offline state. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

According to an embodiment of the present disclosure, there is provided a transaction processing method of a transaction processing apparatus, the method including: reading card information used in settlement of a transaction using a card; causing information regarding various matters relating to the settlement process of transaction content using the card to be input to an input unit; and printing the card information and the information regarding various matters input to the input unit as an offline settlement slip in a printing unit, according to the settlement process of the transaction content using the card, when the communication with a predetermined settlement destination apparatus relating to the settlement process of the transaction content using the card is not available.

In this case, when the communication relating to the settlement process of the transaction content using a card is not available between the transaction processing apparatus and the predetermined settlement destination apparatus, the transaction processing apparatus prints the information regarding various matters relating to the settlement process input to the input unit and the card information read by the magnetic card reader unit as the offline settlement slip, for each time of the settlement process of the transaction content using a card.

Accordingly, when the communication between the transaction processing apparatus and the predetermined settlement destination apparatus (for example, a settlement center apparatus) relating to the settlement process of the transaction content using a card is not available (that is, offline state), the transaction processing apparatus prints the information (transaction information) regarding various matters (for example, the card brand, the settlement amount, the payment method, or the number of times of the payment) relating to the settlement process performed in the offline state and the card information regarding the card used in the settlement process as the offline settlement slip and then removes the information regarding various matters. Accordingly, even when the transaction processing apparatus is taken or is broken, it is possible to prevent degradation of information security of the transaction information by property managing paper of the offline settlement slip, adequately ensure the information security of the transaction information, and to reduce a risk of the transaction information being taken by a third party even in the offline state. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

According to an embodiment of the present disclosure, there is provided a program which causes a transaction processing apparatus which is a computer to execute a process including: reading card information used in settlement of transaction using a card; causing information regarding various matters relating to the settlement process of transaction content using the card to be input to an input unit; printing the card information and the information regarding various matters input to the input unit as an offline settlement slip in a printing unit, according to the settlement process of the transaction content using the card, when the communication with a predetermined settlement destination apparatus relating to the settlement process of the transaction content using the card is not available; and removing the information regarding various matters input to the input unit corresponding to the offline settlement slip, after the offline settlement slip is printed.

In this case, when the communication relating to the settlement process of the transaction content using a card is not available between the transaction processing apparatus and the predetermined settlement destination apparatus, the transaction processing apparatus which is a computer including the program installed therein prints the information regarding various matters relating to the settlement process input to the input unit and the card information read by the magnetic card reader unit, for each time of the settlement process of the transaction content using a card.

Accordingly, when the communication relating to the settlement process of the transaction content using a card between the transaction processing apparatus and the predetermined settlement destination apparatus (for example, a settlement center apparatus) is not available (that is, offline state), the transaction processing apparatus prints information (transaction information) regarding various matters (for example, the card number, the card brand, the settlement amount, the payment method, or the number of times of the payment) relating to the settlement process performed in the offline state and the card information used in the settlement process as the offline settlement slip and then removes the information regarding various matters. Accordingly, even when the transaction processing apparatus is taken or is broken, it is possible to prevent degradation of information security of the transaction information by property managing paper of the offline settlement slip, to adequately ensure the information security of the transaction information, and to reduce a risk of the transaction information being taken by a third party even in the offline state. The possibility of losing the transaction information tanked in the broken transaction processing apparatus is reduced, while also reducing the complicatedness of a settlement procedure and loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

According to an embodiment of the present disclosure, there is provided a transaction processing system in which a transaction processing apparatus and a predetermined settlement destination apparatus are connected to each other, and the transaction processing apparatus includes: a communication unit which performs communication relating to a settlement process of transaction content using a card with the predetermined settlement destination apparatus; a magnetic card reader unit which reads card information, which is used in the settlement of the transaction using the card, from the card; an input unit to which information regarding various matters relating to the settlement process of transaction content using the card is input; and a printing unit which prints the card information and the information regarding various matters input to the input unit as an offline settlement slip, according to the settlement process of the transaction content using the card, when the communication relating to the settlement process in the communication unit is not available.

In this case, when the communication relating to the settlement process of the transaction content using a card is not available between the transaction processing apparatus and the predetermined settlement destination apparatus, the transaction processing apparatus prints the information regarding various matters relating to the settlement process input to the input unit and the card information read by the magnetic card reader unit, for each time of the settlement process of the transaction content using a card.

Accordingly, when the communication relating to the settlement process of the transaction content using a card between the transaction processing apparatus and the predetermined settlement destination apparatus (for example, a settlement center apparatus) is not available (that is, offline state), the transaction processing apparatus prints information (transaction information) regarding various matters (for example, the card brand, the settlement amount, the payment method, or the number of times of the payment) relating to the settlement process performed in the offline state and the card information used in the settlement process as the offline settlement slip and then removes the information regarding various matters. Accordingly, even when the transaction processing apparatus is taken or is broken, it is possible to prevent degradation of information security of the transaction information by property managing paper of the offline settlement slip, to adequately ensure the information security of the transaction information, and to reduce a risk of the transaction information being taken by a third party even in the offline state. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

According to the embodiments of the present disclosure, it is possible to adequately ensure the information security of the transaction information relating to the settlement process performed in the offline state, and to reduce a risk of the transaction information being taken in the offline state. The possibility of losing the transaction information tanked in the broken transaction processing apparatus is reduced, while also reducing the complicatedness of a settlement procedure and a loss due to an unauthorized card settlement transaction. It is possible to effectively perform the offline settlement, even with a card having a settlement system in which information necessary for authentication of the card to be used in the settlement process is transmitted and received between the transaction terminal apparatus and the settlement destination apparatus.

DETAILED DESCRIPTION OF THE PREFERRED EMBODIMENTS

Hereinafter, embodiments of the present disclosure will be described with reference to the drawings. In each of the following embodiments, a transaction processing apparatus according to the present invention will be described as a settlement terminal apparatus which has a function of performing a settlement process of transaction content using a card (for example, a credit card) and is installed in a store. The transaction content herein indicates a purchase of a product and offering of the service. The "store" herein is a store that concludes a member store contract to treat card settlement with an acquirer or an issuer (card company) and is also referred to as a "member store".

First Embodiment

Figure 1A:
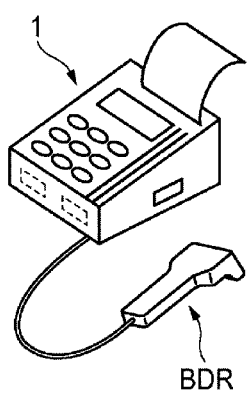
FIG. 1A is a diagram showing a first example of a transaction processing apparatus of one embodiment.
Figure 1B:
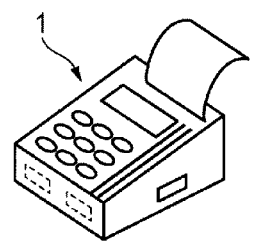
FIG. 1B is a diagram showing a second example of the transaction processing apparatus of one embodiment.

FIG. 1A is a diagram showing a first example of transaction processing apparatus 1 of one embodiment. FIG. 1B is a diagram showing a second example of transaction processing apparatus 1 of one embodiment. Transaction processing apparatus 1 shown in FIG. 1A is portable and a housing having an approximately rectangular parallelepiped shape and symbol reader BDR (see FIG. 4) are integrally connected to each other. In transaction processing apparatus 1 shown in FIG. 1B, a housing having an approximately rectangular parallelepiped shape and symbol reader BDR are not integrally connected to each other. In this case, symbol reader BDR is configured as an apparatus separated from transaction processing apparatus 1.

Figure 2:
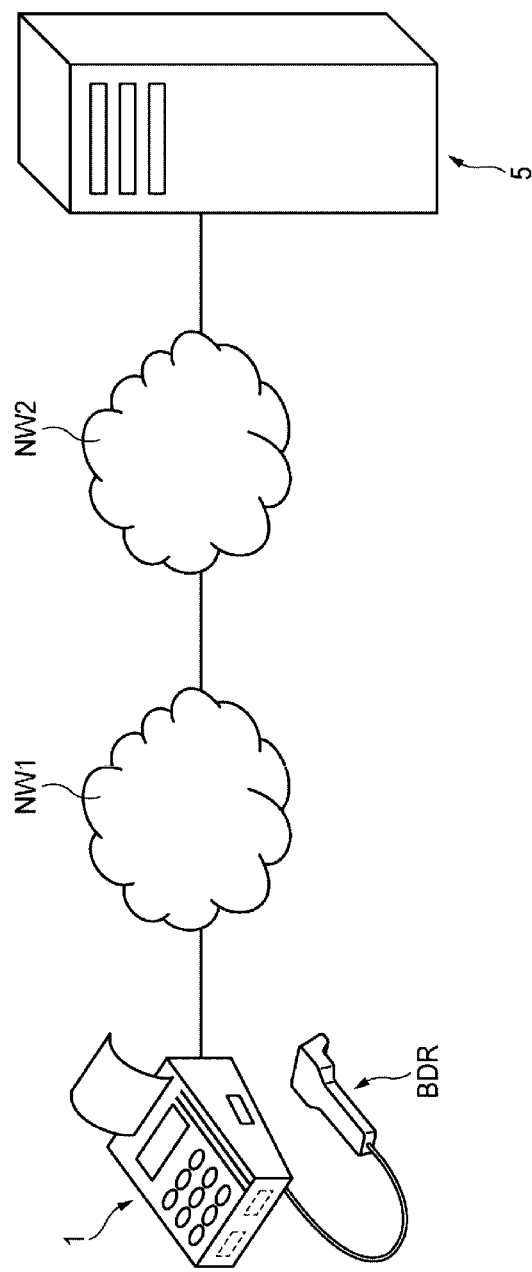
FIG. 2 is a diagram showing a first example of a system configuration of a transaction processing system of one embodiment.

FIG. 2 is a diagram showing a first example of a system configuration of transaction processing system 10 of one embodiment. Transaction processing system 10 shown in FIG. 2 has a configuration in which transaction processing apparatus 1, including symbol reader BDR connected thereto, and settlement center apparatus 5, as an example of a predetermined settlement destination apparatus, are connected to each other through a network (intranet NW1 and internet NW2). Transaction processing apparatus 1 and symbol reader BDR are connected to each other through a wired cable, for example.

The network is intranet NW1 and/or internet NW2 connecting a wireless network or a wired network as an interface. The wireless network is, for example, a wireless Local Area Network (LAN), a wireless Wide Area Network (WAN), 3G, Long Term Evolution (LTE), or Wireless Gigabit (WiGi). The wired network is, for example, IEEE 802.3 or ETHERNET (registered trademark).

Transaction processing apparatus 1 performs communication relating to a settlement process of transaction content using card CrD (see FIG. 5) with settlement center apparatus 5, inputs information regarding various matters relating to the settlement process of the transaction content using card CrD into touch panel TP, and prints the information regarding various matters input to touch panel TP as an offline settlement slip, for each time of the settlement process of the transaction content using card CrD, in a case where the communication relating to the settlement process is not available (that is, offline state). After printing the offline settlement slip, transaction processing apparatus 1 removes the information regarding various matters which is input to touch panel TP and corresponds to the offline settlement slip. The specific configuration of transaction processing apparatus 1 will be described with reference to FIG. 4.

Settlement center apparatus 5 is, for example, a server apparatus (settlement center) for a settlement process of an issuer (that is, a card company) or an acquirer (that is, a company which recruits member stores treating specific card settlement and manages sales information based on the card settlement of the member stores) which directly concludes member store contract with a member stores, or a server apparatus for a settlement relay process (settlement relay center) of a third party processor (that is, a company which takes an outsourcing operation from an issuer or an acquirer and performs a relay operation of the settlement process from each member store). Settlement center apparatus 5 receives credit inquiry of the settlement process of the transaction content from transaction processing apparatus 1 through intranet NW1 and internet NW2, and determines whether or not to offer credit, or collates determination thereof from an issuer or an acquirer. Settlement center apparatus 5 replies to transaction processing apparatus 1 with the credit result or the determination result of the credit collation through internet NW2 and intranet NW1.

Figure 3:
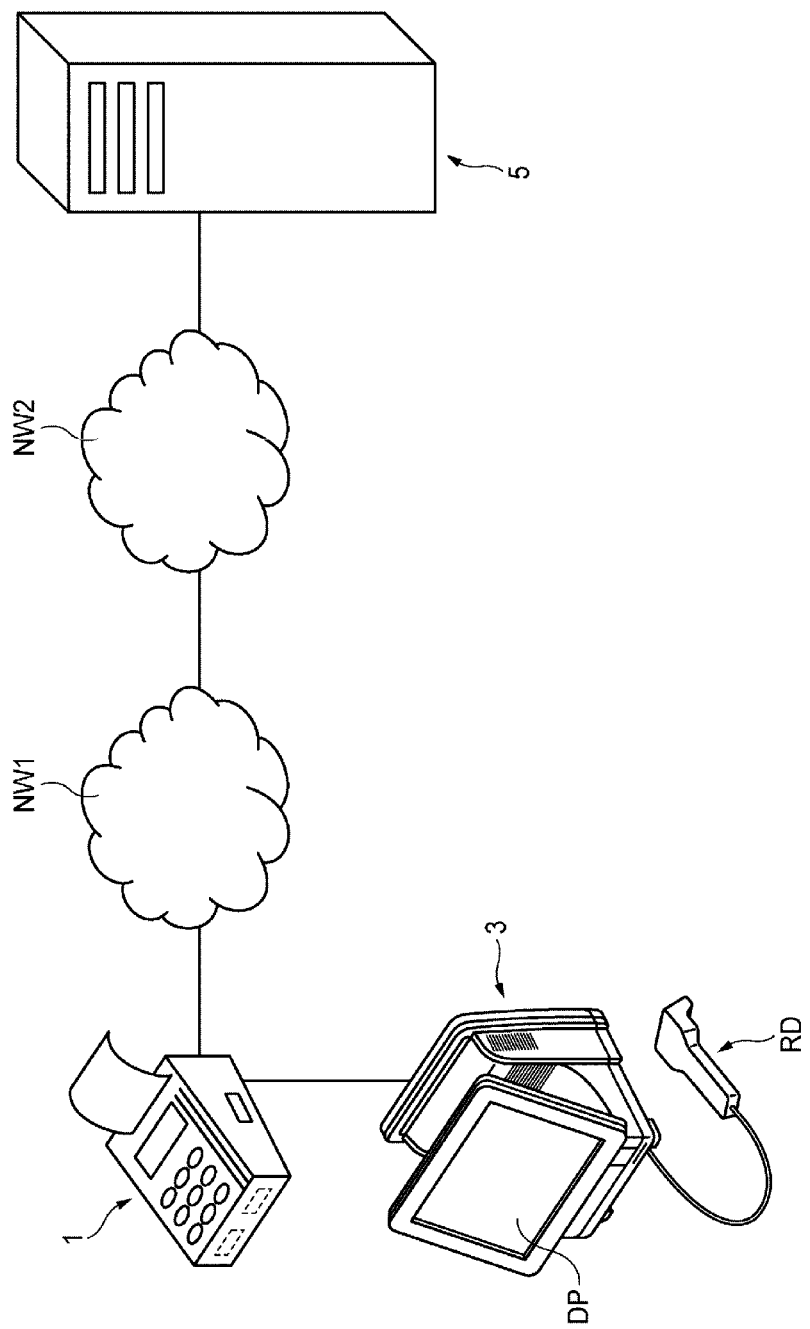
FIG. 3 is a diagram showing a second example of a system configuration of a transaction processing system of one embodiment.

FIG. 3 is a diagram showing a second example of a system configuration of transaction processing system 10A of one embodiment. Transaction processing system 10A shown in FIG. 3 includes transaction processing apparatus 1, Point-Of-Sales (POS) terminal 3 including barcode reader RD connected thereto, and settlement center apparatus 5. In the description of transaction processing system 10A shown in FIG. 3, the same reference numerals are used for the same configuration as that of units of transaction processing system 10 shown in FIG. 2 and the description thereof will be omitted.

POS terminal 3 is connected to transaction processing apparatus 1 through a cable, for example, displays on touch panel display DP product information, service information, or price information thereof regarding a product or a service board (that is, paper showing barcodes as a list for showing the title of the service and the price of the service) showing the service items, which is read by barcode reader RD and to which a barcode is attached, and stores information regarding the product or the service to be a target of the settlement process in a storage unit (not shown). In FIG. 3, barcode reader RD connected to the POS terminal 3 may be used as symbol reader BDR shown in FIG. 1A.

Figure 4:
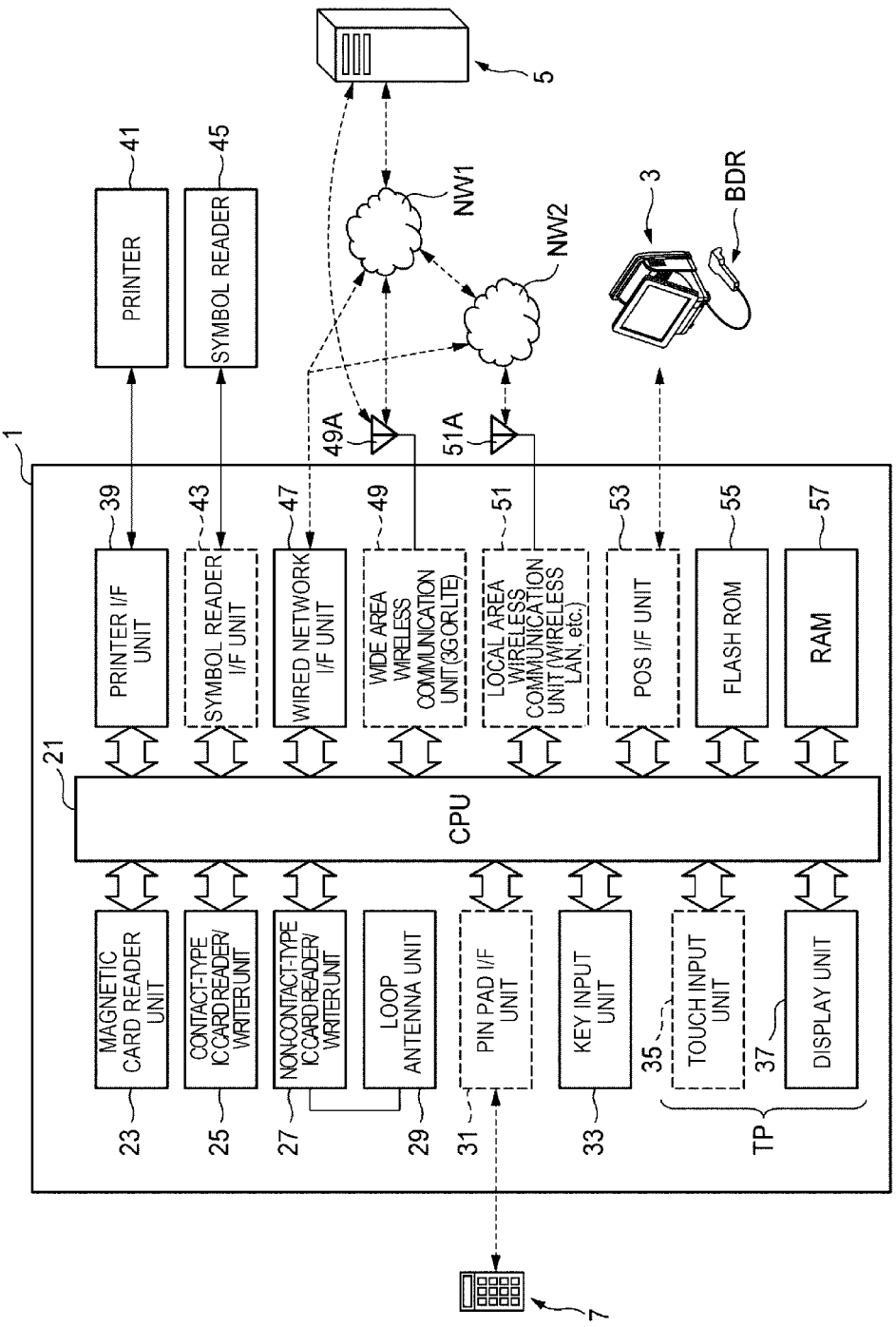
FIG. 4 is a block diagram showing an example of a hardware configuration of the transaction processing apparatus of one embodiment.

Next, an example of a hardware configuration of transaction processing apparatus 1 of the embodiment will be described with reference to FIG. 4. FIG. 4 is a block diagram showing an example of the hardware configuration of transaction processing apparatus 1 of one embodiment.

Transaction processing apparatus 1 shown in FIG. 4 includes central processing unit (CPU) 21, magnetic card reader unit 23, contact-type IC card reader/writer unit 25, non-contact-type IC card reader/writer unit 27, loop antenna unit 29, PIN PAD I/F unit 31, key input unit 33, touch input unit 35, display unit 37, printer I/F unit 39, printer 41, symbol reader I/F unit 43, symbol reader 45, wired network I/F unit 47, wide area wireless communication unit 49 to which wide area wireless communication antenna 49A is connected, local area wireless communication unit 51 to which local area wireless communication antenna 51A is connected, POS I/F unit 53, flash read only memory (ROM) 55, and random access memory (RAM) 57.

CPU 21 performs a control process for totally managing operations of each unit of transaction processing apparatus 1, an input and output process of data to and from each of the other units, a computing (calculation) process of data, and a storage process of data.

For example, in transaction processing apparatus 1, when all of wired network I/F unit 47, wide area wireless communication unit 49, and local area wireless communication unit 51 are in a state where communication is not available (offline state), the following process is performed by executing each process along with a code regulated in a program according to the invention. CPU 21, as an example of an encryption unit which encrypts information (settlement information), including information regarding card CrD read by magnetic card reader unit 23, for each time of the settlement process of the transaction content using card CrD and information (for example, payment method or number of times of payment such as one-time payment) regarding various matters relating to the settlement process input to touch input unit 35 of touch panel TP, using a key which can be decrypted by settlement center apparatus 5 (see FIG. 4 (settlement destination apparatus)). The key used in the encryption may be stored in transaction processing apparatus 1 in advance, generated by transaction processing apparatus 1 by communicating with settlement center apparatus 5 (settlement destination apparatus), or provided from settlement center apparatus 5 (settlement destination apparatus). As the key used in the encryption, a public key having a public key encryption system may be used or the same common key may be used for an encryption key and a decryption key. In the case of the common key, the common key is stored in a physical and logical area in transaction processing apparatus 1 which is entirely isolated from an impact from the outside of transaction processing apparatus 1, such as takeover, change or removal of the key. CPU 21, as an example of a symbol generation unit, encodes information (hereinafter, "encryption information"), in which settlement information including information regarding card CrD read by magnetic card reader unit 23 and various matters relating to the settlement process are encrypted, on a two-dimensional barcode and generates data of two-dimensional barcode BD1 of an offline settlement slip (see FIG. 7) corresponding to the encryption information. CPU 21 outputs data of two-dimensional barcode BD1 to printer I/F unit 39. The two-dimensional barcode is an example of a symbol having a predetermined shape.

After printing offline settlement slip RC1 (for example, after data of two-dimensional barcode BD1, as an example of a symbol, is output to printer I/F unit 39) by printer 41 by executing each process according to the code regulated in the program according to the invention, CPU 21, as an example of a removing unit, removes data, including settlement information MPY (which will be described later), relating to the settlement process of the transaction content and sales area information regarding the transaction (store information CNR), the encryption information thereof, and two-dimensional barcode BD1, which are held in RAM 57 or a cache (not shown) of CPU 21. Only a part of settlement information MPY and store information CNR may be removed.

When the communication state of any one of wired network I/F unit 47, wide area wireless communication unit 49, and local area wireless communication unit 51 of transaction processing apparatus 1 is recovered to a state where the communication is available (online state), an operator performs reading of two-dimensional barcode BD1 printed on offline settlement slip RC1. The reading of the two-dimensional barcode BD1 is performed using symbol reader BDR. Symbol reader I/F unit 43, as an example of an acquisition unit of transaction processing apparatus 1, decodes encryption information from read two-dimensional barcode BD1. The decoded encryption information is transmitted to settlement center apparatus 5 using any one of wired network I/F unit 47, wide area wireless communication unit 49, or local area wireless communication unit 51.

Settlement center apparatus 5 (settlement destination apparatus) receives the encryption information transmitted from transaction processing apparatus 1, performs decryption of the encryption information, and performs sales registration of the transaction content using the card, by using decryption information regarding various matters.

When the communication state of any one of wired network I/F unit 47, wide area wireless communication unit 49, or local area wireless communication unit 51 of transaction processing apparatus 1 is recovered to a state where the communication is available (online state) from a state where the communication is not available (offline state) by executing each process according to the code regulated in the program according to the invention, CPU 21, as an example of a settlement processing unit, performs the settlement process with settlement center apparatus 5 using information regarding various matters relating to the settlement process input to touch input unit 35 of touch panel TP in the settlement process of the transaction content using card CrD, through any one of wired network I/F unit 47, wide area wireless communication unit 49, or local area wireless communication unit 51.

Magnetic card reader unit 23 is disposed in a slit (not shown) provided on a side surface of the housing of transaction processing apparatus 1, has a function of reading a magnetic stripe of a magnetic card, and reads out various information items registered in the magnetic card from the read magnetic stripe to output the information items to CPU 21.

Contact-type IC card reader/writer unit 25 is disposed in an insertion slot (not shown) of a contact-type IC card provided on a side surface (for example, lower left side of the space with respect to transaction processing apparatus 1 shown in FIG. 1) of the housing of transaction processing apparatus 1, and reads or writes card information registered in the contact-type IC card through an electrode of the contact-type IC card inserted into the insertion slot. The card information read by contact-type IC card reader/writer unit 25 is input to CPU 21.

Non-contact-type IC card reader/writer unit 27 is, for example, connected to loop antenna unit 29 disposed to be approximately parallel to display unit 37 of transaction processing apparatus 1, performs wireless communication with a card (for example, a credit card) in a non-contact manner, for example, using predetermined near field communication (NFC), and reads or writes card information registered in non-contact-type IC card reader/writer unit 27. The card information read by non-contact-type IC card reader/writer unit 27 is input to CPU 21.

PIN PAD I/F unit 31, for example, is connected to PIN PAD 7 which is a numeric keypad used when a purchaser of a product inputs a personal identification number (PIN), acquires PIN information input by a purchaser, and outputs the PIN information to CPU 21.

Key input unit 33 is, for example, a push-type button provided on the housing of transaction processing apparatus 1 and is used for an input operation regarding various information (for example, card number or card brand) relating to a card used in the settlement process by a sales clerk, when performing the settlement process, for example. A card holder of a card used in the settlement process may also use key input unit 33 even when inputting the PIN.

Touch input unit 35 has a function of detecting touch input with respect to touch panel TP of transaction processing apparatus 1.

Display unit 37 is configured using a liquid crystal display (LCD) or an organic electroluminescence (EL), for example, and has a function of controlling the display of touch panel TP of transaction processing apparatus 1. In the embodiment, touch panel TP of transaction processing apparatus 1 is configured with touch input unit 35 and display unit 37.

When all of wired network I/F unit 47, wide area wireless communication unit 49, and local area wireless communication unit 51 are in a state where communication is not available (offline state), printer I/F unit 39 acquires data of two-dimensional barcode BD1, as an example of a symbol generated by CPU 21, and outputs the data to printer 41.

Printer 41, as an example of a printing unit, is accommodated in the housing of transaction processing apparatus 1, and prints the data of two-dimensional barcode BD1 output from printer I/F unit 39 to a printing sheet (not shown), when all of wired network I/F unit 47, wide area wireless communication unit 49, and local area wireless communication unit 51 are in a state where communication is not available (offline state), for example.

Symbol reader I/F unit 43 acquires data of a one-dimensional barcode or two-dimensional barcode BD1 read by symbol reader 45 (for example, symbol reader BDR shown in FIG. 1) and outputs the data to CPU 21.

Symbol reader 45 is, for example, configured using symbol reader BDR, reads two-dimensional barcode BD1 printed as offline settlement slip RC1, and outputs data (that is, encryption information) relating to the read result to symbol reader I/F unit 43.

Wired network I/F unit 47 is connected to internet NW2, which is a wire network, or intranet NW1 of a store and performs communication with settlement center apparatus 5 through internet NW2 or with settlement center apparatus 5 through intranet NW1 and internet NW2.

Wide area wireless communication unit 49 is connected to wide area wireless communication antenna 49A and has a function of performing communication through internet NW2 or through a wide area wireless communication channel (for example, wide area network (WAN)) such as a connection mode using a phone line through an access point (not shown) expanded by a trader who manages settlement center apparatus 5. The communication in the wide area wireless communication channel may be performed using mobile communication such as Wideband Code Division Multiple Access (W-CDMA), Universal Mobile Telecommunications System (UMTS), Code Division Multiple Access (CDMA 2000), or Long Term Evolution (LTE).

Local area wireless communication unit 51 is connected to local area wireless communication antenna 51A and has a function of performing wireless LAN communication, for example, using a local area wireless communication channel such as intranet NW1. Local area wireless communication unit 51 may perform communication other than the wireless LAN communication (for example, Bluetooth™ communication).

When POS terminal 3 is connected to transaction processing apparatus 1 (for example, FIG. 3), POS I/F unit 53 acquires input information from POS terminal 3 and outputs output information for POS terminal 3 to POS terminal 3.

Flash ROM 55 has a function of storing various data items. The stored data items may be, for example, a program code and data of an application (application for the settlement process) used in the settlement process between the transaction processing apparatus and the settlement center apparatus 5, a program code and data of an application (each application for an operation process) relating to various operations, and a program code and data for controlling each unit of transaction processing apparatus 1.

RAM 57, as an example of a storing unit, is a memory used for temporarily storing process data generated during the computing process, when performing the computing process with the operation of CPU 21, for example. For example, RAM 57 temporarily saves encryption information before decoding to two-dimensional barcode BD1 printed as the offline settlement slip.

Figure 5:
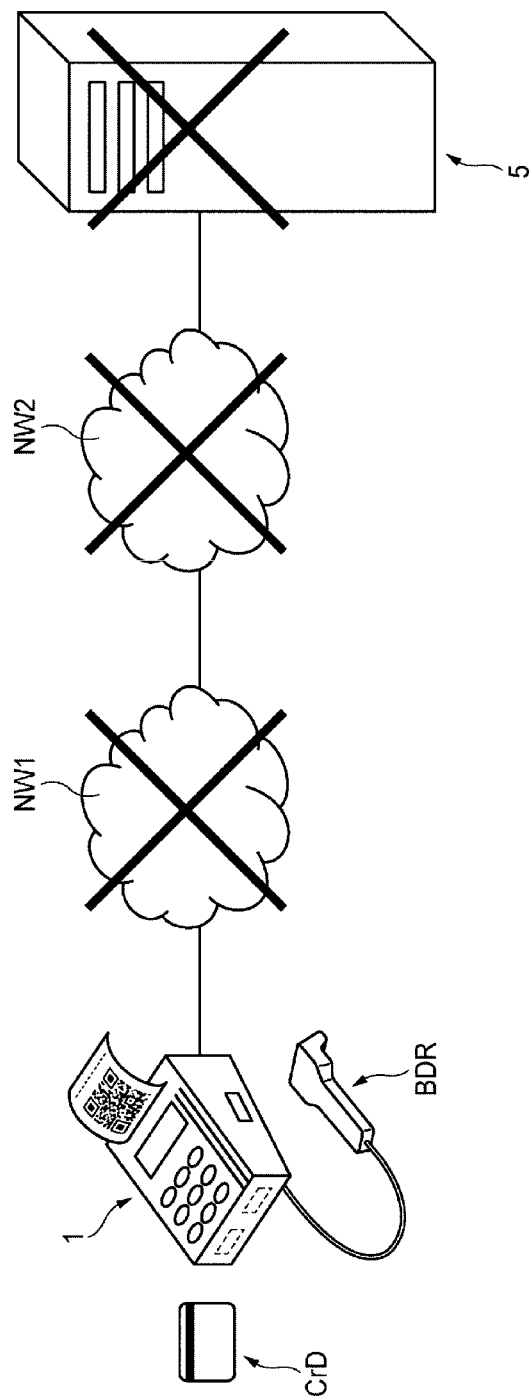
FIG. 5 is a diagram showing an operation example of the transaction processing apparatus at the time of offline settlement in the transaction processing system of one embodiment.
Figure 6:
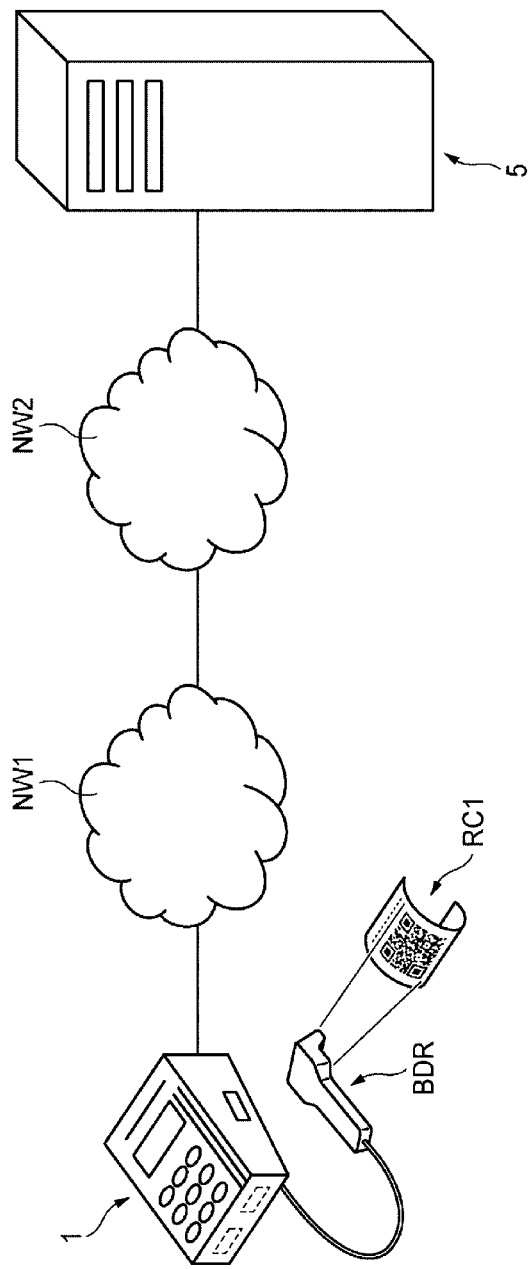
FIG. 6 is a diagram showing an operation example of the transaction processing apparatus after online recovery in the transaction processing system of one embodiment.

FIG. 5 is a diagram showing an operation example of transaction processing apparatus 1 at the time of offline settlement in transaction processing system 10 of one embodiment. FIG. 6 is a diagram showing an operation example of transaction processing apparatus 1 after online recovery in transaction processing system 10 of one embodiment. FIG. 5 shows a case where all of intranet NW1, internet NW2, and settlement center apparatus 5 are down (in a non-usable state), for example, but the example may be a state where any one of intranet NW1, internet NW2, or settlement center apparatus 5 is down, as long as the communication between transaction processing apparatus 1 and settlement center apparatus 5 is not available.

Figure 8:
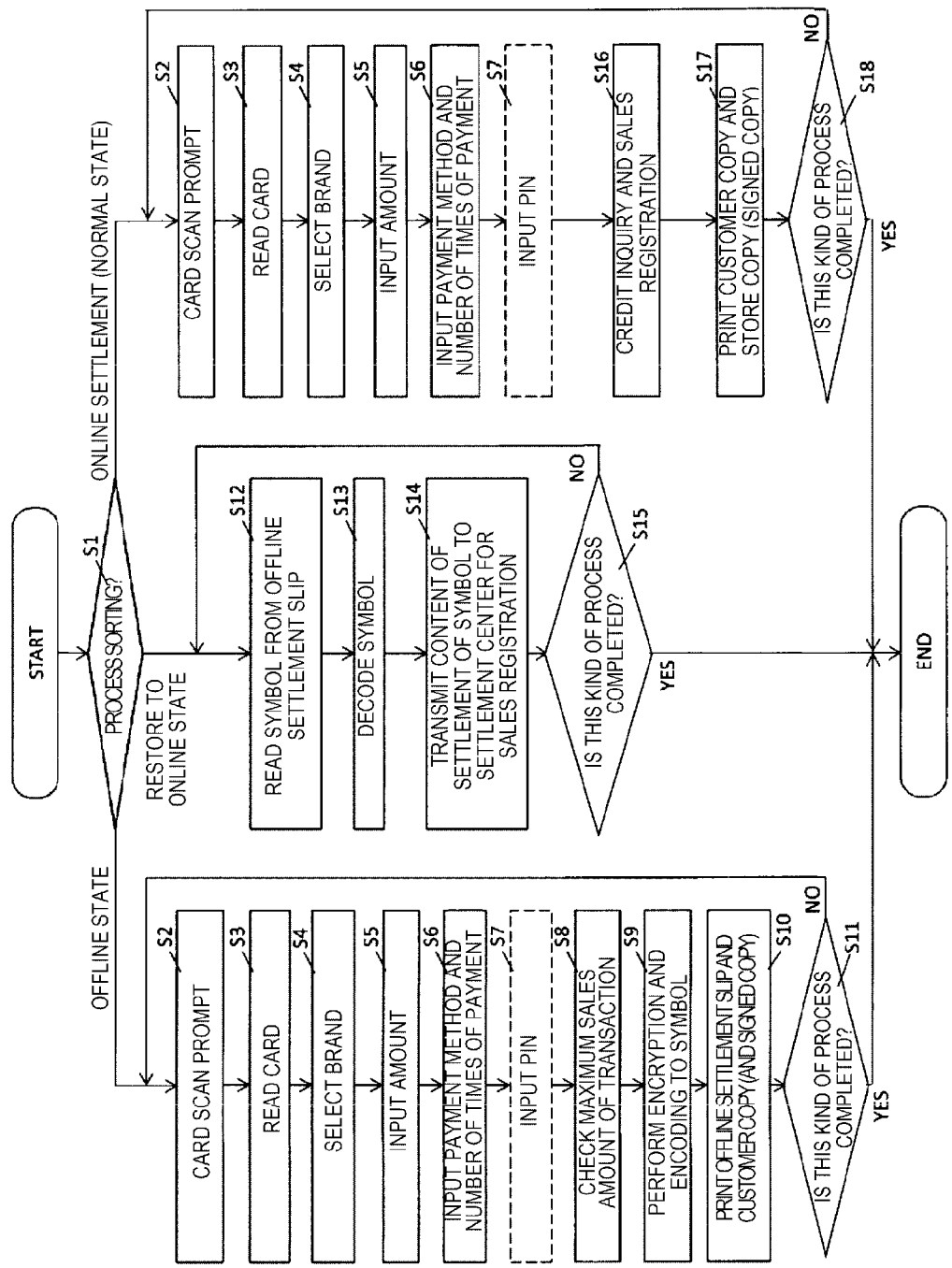
FIG. 8 is a flowchart specifically illustrating each operation procedure performed in the offline settlement, the online recovery, and normal online by the transaction processing apparatus of a first embodiment.

In the offline state shown in FIG. 5, although this will be specifically described in FIG. 8, since transaction processing apparatus 1 and settlement center apparatus 5 do not directly communicate with each other, it is difficult to complete a series of the settlement process of the transaction content using card CrD, and it is only possible to perform a part of the settlement process (for example, a process excluding requesting sales registration shown in FIG. 8) (see FIG. 8). Specifically, it is difficult to perform the communication relating to the settlement process between transaction processing apparatus 1 and settlement center apparatus 5 in the offline state shown in FIG. 5, and accordingly, transaction processing apparatus 1 alone prints the information regarding various matters input to touch panel TP as offline settlement slip RC1, for each time of the settlement process of the transaction content using card CrD.

Meanwhile, as shown in FIG. 6, when the communication state of all intranet NW1, internet NW2, and settlement center apparatus 5 is recovered (online state) from the down state, it is possible to perform the communication between transaction processing apparatus 1 and settlement center apparatus 5, and accordingly, it is possible to complete a series of the settlement process (see FIG. 8). Specifically, in the online state shown in FIG. 6, since transaction processing apparatus 1 can perform communication relating to the settlement process with settlement center apparatus 5, two-dimensional barcode BD1 printed on the offline settlement slip generated in the offline state is read by symbol reader BDR, and the encryption information is decoded and transmitted to settlement center apparatus 5.

Figure 7:
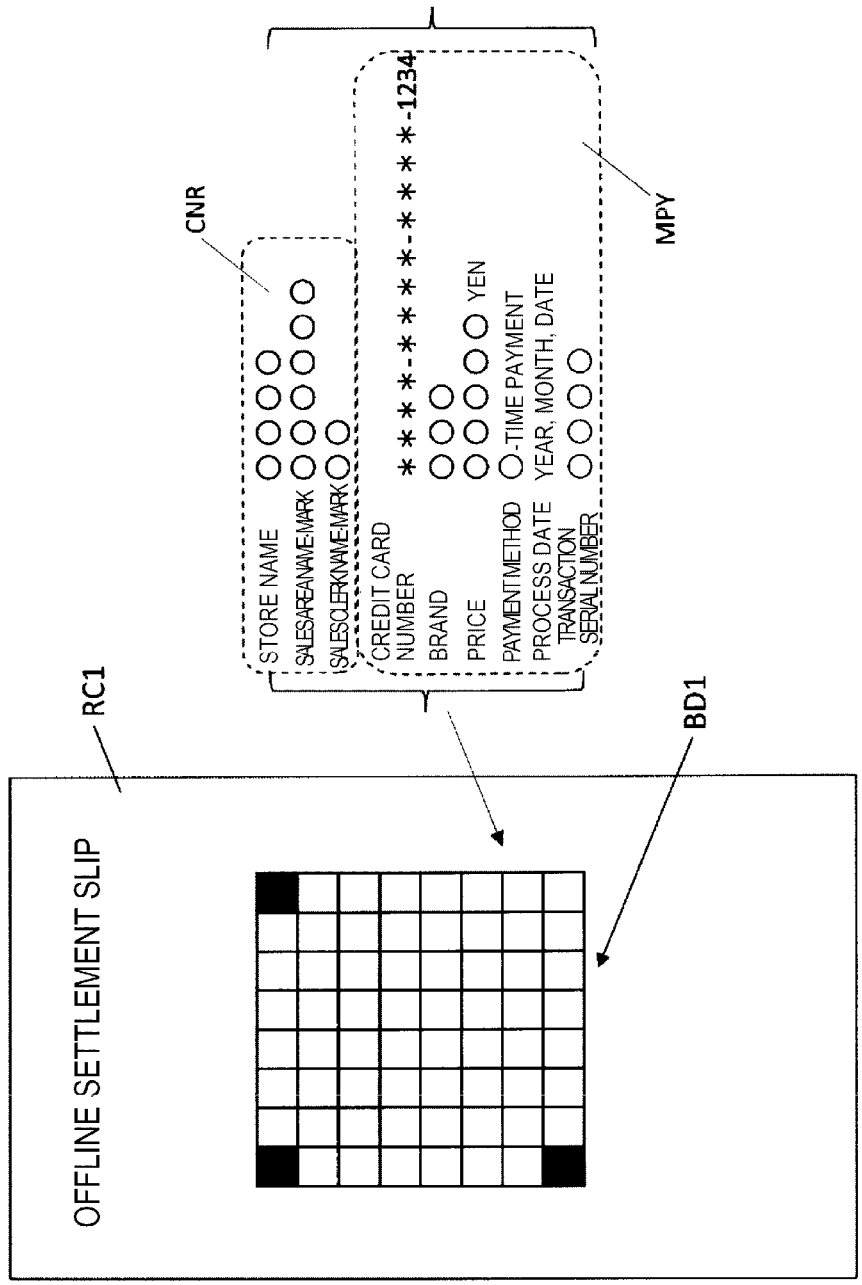
FIG. 7 is an explanatory diagram of an offline settlement slip.

FIG. 7 is an explanatory diagram of offline settlement slip RC1. Regarding offline settlement slip RC1 shown in FIG. 7, data of two-dimensional barcode BD1, as an example of a symbol having a predetermined shape generated by CPU 21, is printed on a predetermined printing sheet. Two-dimensional barcode BD1 is an image generated by encrypting data including the sales area information regarding the transaction (store information CNR) and settlement information MPY relating to the settlement process of the transaction content by CPU 21 and converting the encryption data into the symbol having a predetermined shape. As described above, the data including settlement information MPY relating to the settlement process of the transaction content and sales area information regarding the transaction (store information CNR) is encrypted using a key which can be decrypted by settlement center apparatus 5 (see FIG. 4 (settlement destination apparatus)) and turns into encryption information.

Store information CNR is, for example, information including a store name, a sales area name in the store or a mark showing the sales area, a sales clerk name interacting with a customer in the store, or a mark showing the sales clerk name. Settlement information MPY is, for example, information including a credit card number, a card brand, a settlement amount, a payment method and a number of times of the payment, date of the settlement process, and an identification number of transaction (transaction serial number). Two-dimensional barcode BD1 is generated after store information CNR and settlement information MPY are encrypted by CPU 21.

Next, the operation procedure of transaction processing apparatus 1 will be described with reference to FIG. 8. FIG. 8 is a flowchart specifically illustrating each operation procedure performed in the offline settlement, the online recovery, and normal online by transaction processing apparatus 1 of a first embodiment. In the description of FIG. 8, the same step number is used for the same process and the description will be omitted.

In FIG. 8, in the offline state, for example, as one of the processing sorts for transaction processing apparatus 1 (that is, when all of wired network I/F unit 47, wide area wireless communication unit 49, and local area wireless communication unit 51 are in a state where communication is not available (offline state)) (S1, offline state), CPU 21 causes display unit 37 of touch panel TP to display a prompt (card scan prompt) for encouraging a sales clerk to perform a reading operation of a card (for example, a credit card) in order to operate an application for the settlement process (S2).

When a sales clerk of a member store (for example, a store) performs the reading operation of a credit card held by a customer, magnetic card reader unit 23, contact-type IC card reader/writer unit 25, or non-contact-type IC card reader/writer unit 27 reads information registered in any credit card (that is, a magnetic credit card, a contact-type IC credit card, or a non-contact-type IC credit card) (S3). When the information read by magnetic card reader unit 23, contact-type IC card reader/writer unit 25, or non-contact-type IC card reader/writer unit 27 is received, CPU 21 causes display unit 37 of touch panel TP to display an input screen of the transaction content which is a target of the transaction process in the application for the settlement process.

After that, the sales clerk of the store performs an operation of inputting the information regarding the transaction content which is a target of the transaction process, to touch panel TP, while receiving confirmation from the customer. CPU 21 detects the input operations through touch input unit 35.

For example, a card brand of a magnetic credit card, a contact-type IC credit card, or a non-contact-type IC credit card is selected by the input operation of the sales clerk, and information regarding the selected card brand is input to CPU 21 (S4). Next, the settlement amount is input by the input operation of the sales clerk, and information regarding the input settlement amount is input to CPU 21 (S5). The payment method (for example, one-time payment or payment in installments) is selected, the number of times of the payment is input, and information regarding the selected payment method and input number of times of the payment is input to CPU 21 (S6).

When the credit card is the contact-type IC credit card, the customer inputs the PIN (passcode) or inputs a signature of the customer on the PIN PAD (for example, a numeric keypad from "0" to "9") displayed as a software keyboard or PIN PAD 7 in display unit 37 of touch panel TP according to an instruction of the sales clerk, after the information such as the payment method is input in step S6 (S7). CPU 21 acquires information regarding the PIN or the signature input through touch input unit 35. That is, in step S7, in a case of the settlement in the offline state, identification confirmation is performed to determine whether or not a purchaser (customer) of a product is a right card holder of the credit card.

After Step S6 or Step S7, CPU 21 determines whether or not the settlement amount input in Step S5 exceeds transaction amount conditions at the time of the settlement process in the offline state (offline settlement) which are predetermined based on the member store contract between the store (member store) and an acquirer or an issuer (S8). The information regarding the transaction amount conditions (for example, 100,000 yen as a maximum amount of one-time transaction) at the time of offline settlement is stored in CPU 21 or flash ROM 55 in advance, for example, but may be appropriately updated according to the renewal of the member store contract.

In Step S8, when it is determined that the settlement amount input in Step S5 does not exceed the transaction maximum amount at the time of offline settlement based on the member store contract between the store and an acquirer or an issuer, CPU 21 encrypts the information (so-called settlement information MPY) regarding various matters input from Step S3 to Step S6 and store information CNR described above using a predetermined encryption key (S9). Transaction processing apparatus 1 performs the encryption described above using an encryption key which can be decrypted by the settlement destination apparatus. CPU 21 encodes the encrypted information and generates two-dimensional barcode BD1 as an example of a symbol having a predetermined shape (S9). Offline settlement slip RC1 is generated in order to make the sales clerk of the store conscious of the presence of the sales information to be transmitted to an acquirer, an issuer, or a settlement processor and for back-up when the information tanked in transaction processing apparatus 1 is lost. In the offline settlement using the magnetic credit card, when the operator inputs an approval number to transaction processing apparatus 1, transaction processing apparatus 1 may encrypt the approval number together with settlement information MPY and store information CNR using the predetermined encryption key. Transaction processing apparatus 1 may generate two-dimensional barcode BD1 including the encryption information as an example of a predetermined symbol.

After Step S9, CPU 21 causes printer 41 to print two-dimensional barcode BD1 generated in Step S9 through printer I/F unit 39 and generates offline settlement slip RC1 (S10). Offline settlement slip RC1 is generated in order to make the sales clerk of the store conscious of the presence of the sales information to be transmitted to settlement center apparatus 5 and for back-up when the information tanked in transaction processing apparatus 1 is lost. CPU 21 causes printer 41 to print not only offline settlement slip RC1 through printer I/F unit 39, but also a customer copy regarding the settlement process (offline settlement process) of the transaction content or, if necessary, a signature copy (S10). In Step S10, after printing offline settlement slip RC1 (for example, after data of two-dimensional barcode BD1 (as an example of a symbol) is output to printer I/F unit 39) by printer 41, CPU 21 removes data including settlement information MPY and store information CNR, the encryption information thereof, and two-dimensional barcode BD1, which are held in RAM 57 or a cache (not shown) of CPU 21. After that, when the operations of transaction processing apparatus 1 are completed as one of the processing sorts for transaction processing apparatus 1 (S11, YES), the operations of transaction processing apparatus 1 shown in FIG. 8 are completed. Meanwhile, when the operations of transaction processing apparatus 1 are not completed as one of the processing sorts for transaction processing apparatus 1 (S11, NO), the same process relating to the settlement process of the next transaction content is repeated, and therefore the operation of transaction processing apparatus 1 returns to Step S2.

Meanwhile, in the online state, for example, as one of the processing sorts for transaction processing apparatus 1 (that is, when the communication state of any one of wired network I/F unit 47, wide area wireless communication unit 49, and local area wireless communication unit 51 is recovered to a state where the communication is available (online state) from a state where the communication is not available (offline state)) (S1, online state recovery), offline settlement slip RC1 generated in Step S10 is read by symbol reader BDR as an example of symbol reader 45 (S12). The read information is input to CPU 21 through symbol reader I/F unit 43.

CPU 21 decodes the encryption information from data read in Step S12 (S13). CPU 21 transmits the decoded encryption information to settlement center apparatus 5 (S14). Settlement center apparatus 5 receives the encryption information transmitted from transaction processing apparatus 1 and decrypts the encryption information. Settlement center apparatus 5 performs sales registration to change the settlement amount of the settlement process (offline settlement) performed in the offline state as the sales amount, using the decrypted information regarding various matters (specifically, store information CNR and settlement information MPY). After that, when the operations of transaction processing apparatus 1 are completed as one of the processing sorts for transaction processing apparatus 1 (S15, YES), the operations of transaction processing apparatus 1 shown in FIG. 8 are completed. Meanwhile, when the operations of transaction processing apparatus 1 are not completed as one of the processing sorts for transaction processing apparatus 1 (S15, NO), the same process relating to the settlement process of the next offline settlement slip is repeated, and therefore the operation of transaction processing apparatus 1 returns to Step S12.

In the online state, for example, as one of the processing sorts for transaction processing apparatus 1 (that is, in the normal online state without being turned into the offline state (when all of wired network I/F unit 47, wide area wireless communication unit 49, and local area wireless communication unit 51 are in a state where communication is available (online state))) (S1, online settlement (normal time)), each process from Step S2 to Step S7 is performed as the operations of transaction processing apparatus 1, in the same manner as in the offline state.

After Step S7, CPU 21 determines whether or not to offer credit regarding the settlement process of the transaction content input from Step S3 to Step S6 (credit collation) and requests settlement center apparatus 5 for the sales registration when a response indicating no problems in the credit collation is received (S16). After Step S16, CPU 21 causes printer 41 to print a customer copy and a store copy or, if necessary, a signature copy relating to the settlement process (online settlement process) of the transaction content input from Step S3 to Step S6 through printer I/F unit 39 (S17). After that, when the operations of transaction processing apparatus 1 are completed as one of the processing sorts for transaction processing apparatus 1 (S18, YES), the operations of transaction processing apparatus 1 shown in FIG. 8 are completed. Meanwhile, when the operations of transaction processing apparatus 1 are not completed as one of the processing sorts for transaction processing apparatus 1 (S18, NO), the same process relating to the settlement process of the next online settlement process is repeated, and therefore the operation of transaction processing apparatus 1 returns to Step S2.

As described above, in transaction processing system 10, when the communication relating to the settlement process of the transaction content using a card (for example, a credit card) is not available between transaction processing apparatus 1 and settlement center apparatus 5, which is a predetermined settlement destination apparatus, transaction processing apparatus 1 of the embodiment prints the information regarding various matters relating to the settlement process input to touch panel TP as offline settlement slip RC1, for each time of the settlement process of the transaction content using a card. After offline settlement slip RC1 is printed, transaction processing apparatus 1 removes information (settlement information) including information regarding card CrD read by magnetic card reader unit 23 and information regarding various matters input to touch panel TP corresponding to offline settlement slip RC1.

As described above, when the communication relating to the settlement process of the transaction content using a card between transaction processing apparatus 1 and predetermined settlement destination apparatus (for example, settlement center apparatus 5) is not available (that is, offline state), transaction processing apparatus 1 of the embodiment prints information (transaction information) regarding various matters (for example, the card brand, the settlement amount, the payment method, or the number of times of the payment) relating to the settlement process performed in the offline state as offline settlement slip RC1 and then removes the information regarding various matters. Accordingly, even when transaction processing apparatus 1 is taken by a third party or is broken, it is possible to prevent degradation of information security of the transaction information by property managing paper of offline settlement slip RC1, to adequately ensure the information security of the transaction information, and to reduce a risk of the transaction information being taken by a third party even in the offline state. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

Since transaction processing apparatus 1 generates the symbol having a predetermined shape (two-dimensional barcode BD1) corresponding to the information regarding various matters (transaction information) input to touch panel TP and prints the information as offline settlement slip RC1, for each time of the settlement process of the transaction content using the card, the leakage of the content of the transaction information as text is avoided, even when the symbol having the predetermined shape (two-dimensional barcode BD1) printed on offline settlement slip RC1 is recognized, and therefore, it is possible to reduce degradation of the information security of the transaction information printed on offline settlement slip RC1. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus. Since the symbol indicating the transaction information is printed, it is possible to make the sales clerk of the store conscious of the presence of the sales information to be transmitted to settlement center apparatus 5.

Since transaction processing apparatus 1 encrypts the information regarding various matters (transaction information) input to touch panel TP, generates the symbol having the predetermined shape (two-dimensional barcode BD1) corresponding to the encrypted information, and prints the symbol on offline settlement slip RC1, for each time of the settlement process of the transaction content using a card, the leakage of the transaction information is avoided, as long as the decryption key of the transaction information is not provided, even when offline settlement slip RC1 is taken by a third party and the content of the symbol is read by symbol reader 45. Therefore, it is possible to reduce degradation of the information security of the transaction information printed on offline settlement slip RC1, compared to a case where the transaction information is not encrypted before printing of offline settlement slip RC1. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

When the communication relating to the settlement process is turned into the available state from the unavailable state, transaction processing apparatus 1 acquires the information regarding various matters input to touch panel TP in regard to the settlement process of the transaction content using the card, according to the reading of offline settlement slip RC1, and requests settlement center apparatus 5 for the sales registration of the transaction content using the card, by using the information.

As described above, when the communication state is recovered to the online state from the offline state, transaction processing apparatus 1 can perform sales registration of the transaction content to settlement center apparatus 5 using the information regarding various matters (transaction information) input in regard to the settlement process of the transaction content using the card in the offline state, and therefore, it is possible to formally complete a series of the settlement process. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

When the communication relating to the settlement process is turned into the available state from the unavailable state, transaction processing apparatus 1 decodes encryption information obtained by encrypting the information of card CrD read by magnetic card reader unit 23 and information regarding various matters input to touch panel TP in regard to the settlement process of the transaction content using a card, according to the reading of offline settlement slip RC1, and transmits the information to settlement center apparatus 5 in the encrypted state. The encryption information is encrypted using a key which can be decrypted by settlement center apparatus 5.

As described above, when the communication state is recovered to the online state from the offline state, transaction processing apparatus 1 transmits the information regarding various matters (transaction information) input in regard to the settlement process of the transaction content using the card in the offline state, to settlement center apparatus 5 in the encrypted state using a key which can be decrypted by settlement center apparatus 5. Accordingly, it is possible to reduce the leakage of the content of the transaction information, to perform sales registration of the transaction content to settlement center apparatus 5, and to formally complete a series of the settlement process. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

Second Embodiment

In a second embodiment, an example of a transaction processing apparatus which accumulates (tanks) data relating to the settlement process when there is a space in capacity of a memory and prints an offline settlement slip using data relating to the settlement process in the same manner as in the first embodiment, will be described when there is no space in capacity of the memory (for example, RAM 57) in the settlement process in the offline state.

Since a system configuration of a transaction processing system including the transaction processing apparatus of the embodiment and an internal configuration of the transaction processing apparatus are the same as in the first embodiment, the description relating to the same content will be omitted, and different content will be described.

Figure 9:
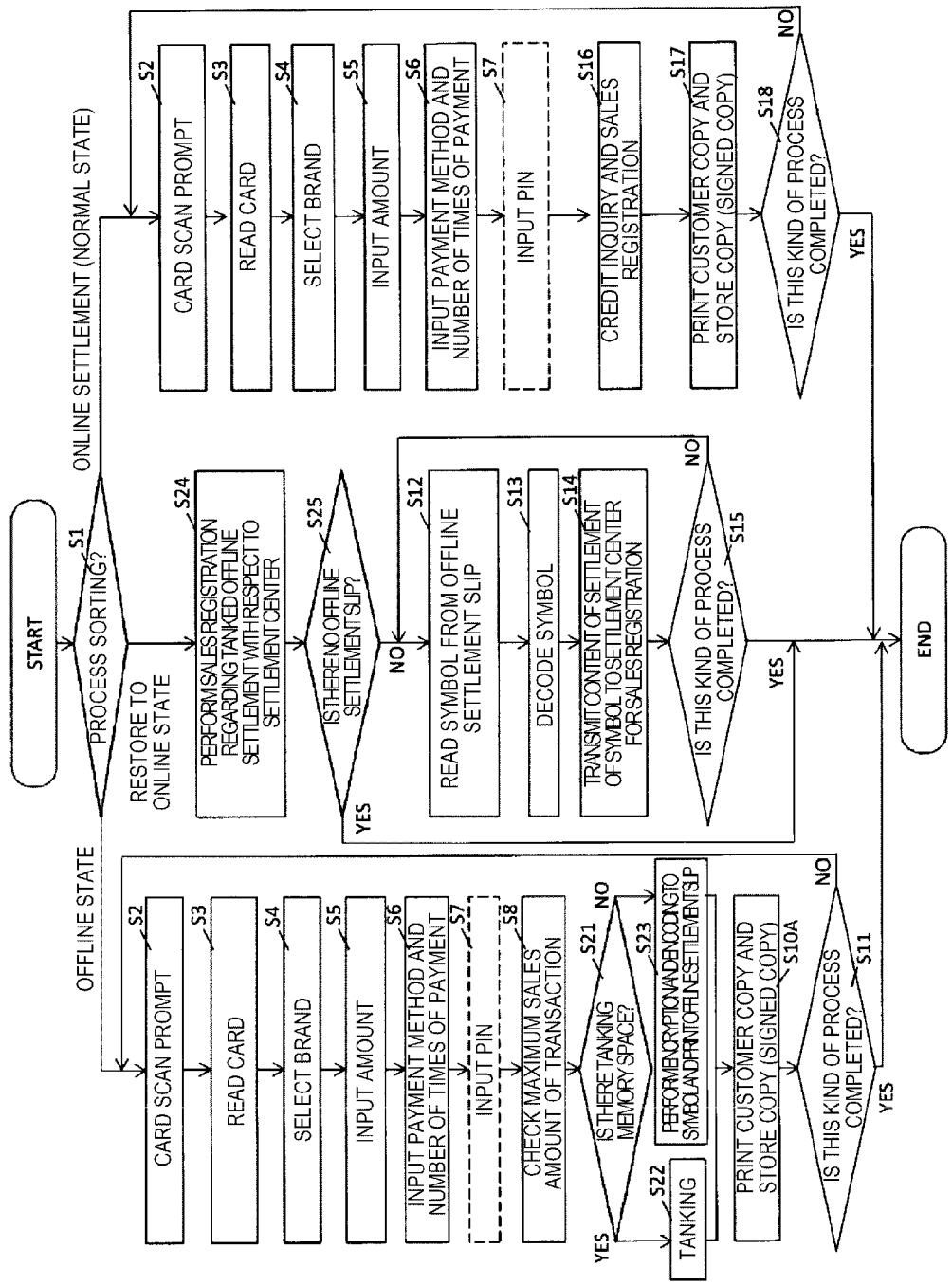
FIG. 9 is a flowchart specifically illustrating each operation procedure performed in the offline settlement, the online recovery, and normal online by the transaction processing apparatus of a second embodiment.

Next, the operation procedure of transaction processing apparatus 1 of the embodiment will be described with reference to FIG. 9. FIG. 9 is a flowchart specifically illustrating each operation procedure performed in the offline settlement, the online recovery, and normal online by transaction processing apparatus 1 of the second embodiment. In the description of each process shown in FIG. 9, the same reference numerals are used for the process shown in FIG. 8, the description thereof will be omitted, and the different content will be described.

In FIG. 9, in Step S8 in the offline state, when it is determined that the settlement amount input in Step S5 does not exceed the transaction maximum amount at the time of offline settlement predetermined based on the member store contract between the store and an acquirer or an issuer, CPU 21 determines whether or not there is a space equal to or greater than a predetermined value in capacity of RAM 57 as a tanking memory for accumulating (tanking) the information regarding various matters relating to the settlement process input to touch panel TP from Step S3 to Step S6 (S21). The embodiment is described using RAM 57 as an example of a tanking memory, but an external storage medium (for example, an SD card) which is not shown in FIG. 4 may be used, for example.

When it is determined that there is a space equal to or greater than a predetermined value in capacity of RAM 57 as a tanking memory (S21, YES), CPU 21 accumulates (tanks) the information regarding various matters relating to the settlement process input to touch panel TP from Step S3 to Step S6 (S22). The tanking process is performed in order to make the sales clerk of the store conscious of the presence of the sales information to be transmitted to an acquirer, an issuer, or a settlement processor and for back-up when the information tanked in transaction processing apparatus 1 is lost. In the offline settlement using the magnetic credit card, when the operator inputs an approval number to transaction processing apparatus 1, transaction processing apparatus 1 may tank the approval number together with settlement information MPY and store information CNR described above. For any information, transaction processing apparatus 1 performs the tanking after performing encryption of the information described above which is to be tanked, using the encryption key which can be decrypted by the settlement destination apparatus.

Meanwhile, when it is determined that there is no space equal to or greater than a predetermined value in capacity of RAM 57 as a tanking memory (S21, NO), CPU 21 encrypts settlement information MPY and store information CNR described above using the encryption key which can be decrypted by the settlement destination apparatus and generates the encryption information (S23). CPU 21 encodes the encryption information into a two-dimensional barcode and generates two-dimensional barcode BD1 (S23). The two-dimensional barcode is an example of a symbol having a predetermined shape. CPU 21 causes printer 41 to print two-dimensional barcode BD1 through printer I/F unit 39 and generates offline settlement slip RC1 (S23). Offline settlement slip RC1 is generated in order to make the sales clerk of the store conscious of the presence of the sales information to be transmitted to settlement center apparatus 5 and for back-up when the information tanked in transaction processing apparatus 1 is lost. In the offline settlement using the magnetic credit card, when the operator inputs an approval number to transaction processing apparatus 1, transaction processing apparatus 1 may encrypt the approval number together with settlement information MPY and store information CNR described above using the predetermined encryption key. Transaction processing apparatus 1 may generate two-dimensional barcode BD1 including the encrypted information described above as an example of a symbol having a predetermined shape.

After Step S22 or Step S23, CPU 21 causes printer 41 to print a customer copy and a store copy or, if necessary, a signature copy relating to the settlement process (offline settlement process) of the transaction content through printer I/F unit 39 (S10A). In Step S10A, after printing offline settlement slip RC1 by printer 41 (for example, after data of two-dimensional barcode BD1, as an example of a symbol, is output to printer I/F unit 39), CPU 21 removes settlement information MPY, store information CNR, encryption information thereof, and data of two-dimensional barcode BD1, which are held in RAM 57 or a cache (not shown) of CPU 21. Only a part of settlement information MPY and only a part of store information CNR may be removed. When tanking is performed in RAM 57 as a tanking memory, CPU 21 removes data of two-dimensional barcode BD1, but does not remove encryption settlement information. After that, when the operations of transaction processing apparatus 1 are completed as one of the processing sorts for transaction processing apparatus 1 (S11, YES), the operations of transaction processing apparatus 1 shown in FIG. 8 are completed. Meanwhile, when the operations of transaction processing apparatus 1 are not completed as one of the processing sorts for transaction processing apparatus 1 (S11, NO), the same process relating to the settlement process of the next transaction content is repeated, and therefore the operation of transaction processing apparatus 1 returns to Step S2.

Next, when the communication state is recovered to the online state from the offline state (S1, online state recovery), CPU 21 performs the encryption and transmits information regarding various matters relating to the settlement process (specifically, store information CNR and settlement information MPY) tanked in RAM 57 as a tanking memory to settlement center apparatus 5 as the encryption settlement information. CPU 21 requests settlement center apparatus 5 for performing sales registration to change the settlement amount of the settlement process (offline settlement) performed in the offline state as the sales amount (S24).

After Step S24, when offline settlement slip RC1 is not printed (S25, YES), the operation of transaction processing apparatus 1 shown in FIG. 9 is completed. Meanwhile, when offline settlement slip RC1 is printed (S25, NO), offline settlement slip RC1 generated in Step S22 is read by symbol reader BDR as an example of symbol reader 45 (S12). The read information is input to CPU 21 through symbol reader I/F unit 43. The processes subsequent to Step S12 are the same as those of processes subsequent to Step S12 of transaction processing apparatus 1 shown in FIG. 8, and therefore the description thereof will be omitted.

In the online state, for example, as one of processing sorts for transaction processing apparatus 1 (that is, in the normal online state without being turned into the offline state (when all of wired network I/F unit 47, wide area wireless communication unit 49, and local area wireless communication unit 51 are in a state where communication is available (online state))) (S1, online settlement (normal time)), the operations of transaction processing apparatus 1 are the same as those of processes subsequent to Step S2 shown in FIG. 8, and therefore the description thereof will be omitted.

As described above, when the communication relating to the settlement process of the transaction content using a card (for example, a credit card) is not available between transaction processing apparatus 1 and settlement center apparatus 5 which is a predetermined settlement destination apparatus, transaction processing apparatus 1 of the embodiment encrypts and tanks (accumulates) the information regarding various matters relating to the settlement process input to touch panel TP, when there is a space equal to or greater than a predetermined value in capacity of RAM 57 as a tanking memory, for each time of the settlement process of the transaction content using a card. Meanwhile, transaction processing apparatus 1 encrypts the information regarding various matters relating to the settlement process input to touch panel TP and prints the encryption information as offline settlement slip RC1, when there is no space equal to or greater than a predetermined value in capacity of RAM 57 as a tanking memory, for each time of the settlement process of the transaction content using a card. After offline settlement slip RC1 is printed, transaction processing apparatus 1 removes the information regarding various matters input to touch panel TP corresponding to offline settlement slip RC1.

As described above, when the communication relating to the settlement process of the transaction content using a card between transaction processing apparatus 1 and predetermined settlement destination apparatus (for example, settlement center apparatus 5) is not available (that is, offline state) and there is a space equal to or greater than a predetermined value in capacity of RAM 57 as a tanking memory, transaction processing apparatus 1 of the embodiment encrypts and tanks the information (transaction information) regarding various matters (for example, the card brand, the settlement amount, the payment method, or the number of times of the payment) relating to the settlement process performed in the offline state. Accordingly, after recovering the communication state to the online state, it is possible to rapidly perform the settlement process relating to requesting settlement center apparatus 5 for the sales registration.

In the same manner as in the first embodiment, when the communication relating to the settlement process of the transaction content using a card between transaction processing apparatus 1 and predetermined settlement destination apparatus (for example, settlement center apparatus 5) is not available (that is, offline state) and there is no space equal to or greater than a predetermined value in capacity of RAM 57 as a tanking memory, transaction processing apparatus 1 encrypts the information (transaction information) regarding various matters (for example, the card brand, the settlement amount, the payment method, or the number of times of the payment) relating to the settlement process performed in the offline state, prints the encryption information as offline settlement slip RC1, and then removes the information regarding various matters. Accordingly, even when transaction processing apparatus 1 is taken by a third party or is broken, it is possible to prevent degradation of information security of the transaction information by property managing paper of offline settlement slip RC1, to adequately ensure the information security of the transaction information, and to reduce a risk of the transaction information being taken by a third party even in the offline state. The possibility of losing the transaction information tanked in the broken transaction processing apparatus is reduced, while also reducing the complicatedness of a settlement procedure and a loss due to an unauthorized card settlement transaction. It is possible to effectively perform the offline settlement using the magnetic credit function attached to the card, even with a card (IC credit card) having a settlement system in which information necessary for authentication of the card to be used in the settlement process is transmitted and received between the transaction terminal apparatus and the settlement destination apparatus.

Hereinabove, various embodiments have been described with reference to the drawings, but the present disclosure is not limited to such examples. It is clear for a person skilled in the art that various modification examples or correction examples may be supposed in a scope disclosed in claims and it is apparent that those are in the technical scope of the present disclosure.

In the embodiments described above, the settlement process using a credit card (more specifically, a magnetic credit card, a contact-type IC credit card, or a non-contact-type IC credit card) has been described as an example of card transaction of a purchaser, but there is no limitation to the settlement process using a credit card, and the settlement process of the embodiment may be applied to a settlement process using a debit card, electronic money, a prepaid card, a postpaid card, a point card, an electronic coupon, or an electronic gift coupon.

What is claimed is:

1. A transaction processing apparatus, comprising:
a controller coupled to a memory device;
a communicator configured to perform communication relating to a transaction settlement process based on a card with a settlement destination apparatus;
a magnetic card reader configured to read card information from the card;
an input device configured to receive transaction settlement information regarding the transaction settlement process; and
a printer configured to print the card information and the transaction settlement information on an offline settlement slip when the communication relating to the transaction settlement process with the settlement destination apparatus is not available.

2. The transaction processing apparatus of claim 1, further comprising:
an encryptor configured to encrypt the card information and the transaction settlement information; and
a symbol generator configured to generate a shaped symbol corresponding to the encrypted information,
wherein the printer, in operation, prints the shaped symbol on the offline settlement slip.

3. The transaction processing apparatus of claim 2, wherein:
the communicator, in operation, transmits the encrypted information to the settlement destination apparatus when the communication with the settlement destination apparatus is available.

4. The transaction processing apparatus of claim 3, further comprising:
a symbol reader configured to read the encrypted information from the symbol printed on the offline settlement slip.

5. The transaction processing apparatus of claim 1, wherein the input device includes at least one of a key input device and a touch input device.

6. The transaction processing apparatus of claim 1, wherein:
the controller is configured to delete the card information from the memory after the printer prints out the offline settlement slip.

7. The transaction processing apparatus of claim 1, wherein:
the card information includes one or more of a card number, a card brand, and a card payment method.

8. The transaction processing apparatus of claim 1, wherein:
the controller is configured to delete the transaction settlement information from the memory after the printer prints out the offline settlement slip.

9. The transaction processing apparatus of claim 1, wherein:
the transaction settlement information includes one or more of a settlement amount, a card brand, and a card payment method.

10. A transaction processing method executed by a transaction processing apparatus, the method comprising:
performing communication relating to a transaction settlement process based on a card with a settlement destination apparatus;
reading card information from the card;
receiving transaction settlement information regarding the transaction settlement process via an input device; and
printing the card information and the transaction settlement information on an offline settlement slip when the communication with the settlement destination apparatus is not available.

11. The transaction processing method of claim 10, further comprising:
encrypting the card information and the transaction settlement information; and
generating a shaped symbol corresponding to the encrypted information,
wherein the shaped symbol is printed on the offline settlement slip.

12. The transaction processing method of claim 11, further comprising:
reading the encrypted information from the symbol printed on the offline settlement slip; and
transmitting the encrypted information to the settlement destination apparatus when the communication with the settlement destination apparatus is available.

13. The transaction processing method of claim 10, further comprising:
deleting the card information from the transaction processing apparatus after the offline settlement slip is printed.

14. The transaction processing method of claim 10, wherein:
the card information includes one or more of a card number, a card brand, and a card payment method.

15. The transaction processing method of claim 10, further comprising:
deleting the transaction settlement information from the transaction processing apparatus after the offline settlement slip is printed.

16. The transaction processing method of claim 10, wherein:
the transaction settlement information includes one or more of a settlement amount, a card brand, and a card payment method.

17. A non-transitory computer-readable medium including a program which causes a transaction processing apparatus to execute a process comprising:
performing communication relating to a transaction settlement process based on a card with a settlement destination apparatus;
reading card information from the card;
receiving transaction settlement information regarding the transaction settlement process via an input device; and
printing the card information and the transaction settlement information on an offline settlement slip when the communication with the settlement destination apparatus is not available.

18. A transaction processing system in which a transaction processing apparatus and a settlement destination apparatus are configured to communicate with each other,
wherein the transaction processing apparatus includes:
a communicator configured to perform communication relating to a transaction settlement process based on a card with the settlement destination apparatus;
a magnetic card reader configured to read card information from the card;
an input device configured to receive transaction settlement information regarding the transaction settlement process; and
a printer configured to print the card information and the transaction settlement information on an offline settlement slip when the communication relating to the transaction settlement process is not available; and wherein the settlement destination apparatus is configured to use the card information and the transaction settlement information printed on the offline settlement slip to complete the transaction settlement process based on the card.

19. The transaction processing system of claim 18, wherein the transaction processing apparatus further includes:
- an encryptor configured to encrypt the card information and the transaction settlement information; and
- a symbol configured to generate a shaped symbol corresponding to the encrypted information, and
- wherein the printer, in operation, prints the shaped symbol on the offline settlement slip.

20. The transaction processing system of claim 19,
wherein the transaction processing apparatus further includes a symbol reader configured to read the encrypted information from the symbol printed on the offline settlement slip, wherein the communicator, in operation, transmits the encrypted information to the settlement destination apparatus when the communication with the settlement destination apparatus is available, and wherein the settlement destination apparatus includes a decryptor configured to decrypt the encrypted information to complete the transaction settlement process based on the card.

* * * * *